United States Patent [19]

Morrissette

[11] Patent Number: 5,716,048
[45] Date of Patent: Feb. 10, 1998

[54] VARIABLE MASK AND UNIVERSAL VACUUM DRUM

[75] Inventor: Roger J. Morrissette, Enfield, N.H.

[73] Assignee: Optronics International Corporation, Chelmsford, Mass.

[21] Appl. No.: 734,255

[22] Filed: Oct. 21, 1996

Related U.S. Application Data

[62] Division of Ser. No. 412,130, Mar. 28, 1995.

[51] Int. Cl.⁶ ..................... B65H 5/02
[52] U.S. Cl. .............. 271/276; 271/196; 355/73; 355/91; 355/104; 355/110; 101/389.1
[58] Field of Search .................... 271/276, 196; 355/73, 85, 91, 104, 110; 399/305; 101/389.1

[56] References Cited

U.S. PATENT DOCUMENTS 3,824,927   7/1974   Pugh et al. ............... 101/389.1

FOREIGN PATENT DOCUMENTS 2202186   9/1988   United Kingdom ............... 101/389.1

*Primary Examiner*—Boris Milef
*Attorney, Agent, or Firm*—Bromberg & Sunstein LLP

[57] ABSTRACT

A vacuum drum apparatus on which a mask is mounted having a resilient surface and an array of holes suitable for a substrate of a given size. The drum is a circular cylinder perforated with an array of holes. A hollow chamber within the drum is connected to a controlled pressure source for providing a vacuum. The mask may be magnetically attracted about the outer surface of the drum. Thus, the mask may be made of a flexible ferromagnetic sheet. The mask is preferably elastomeric and may include an inextensible layer.

11 Claims, 5 Drawing Sheets

VARIABLE MASK AND UNIVERSAL VACUUM DRUM

This is a divisional of copending application Ser. No. 08/412,130 filed on Mar. 28, 1995.

BACKGROUND OF THE INVENTION

The present invention generally relates to plotters, scanners and similar devices that use a rotatable drum for mounting films, printing, plates or documents that are to be exposed or scanned, and particularly such devices which use vacuum drums.

A number of prior art vacuum drums for handling different sized media involve vacuum drum provided with groove or hole arrangements along with valves or separate vacuum chambers for providing different sized areas of vacuum force over the surface of the vacuum drum. For example, U.S. Pat. No. 5,383,001 (Bosy) discloses a valving system and separate vacuum channels for handling media of different sizes. By adjusting the valves, the vacuum channels may be set to accommodate any of a number of media sizes. It is important that a vacuum be applied about the edges of media being mounted on a vacuum drum. Thus the multi-chambered vacuum drum invented by Bosy may only be used on media having any of the several particular sizes that the drum accommodates. Only several specific sizes are accommodated.

Likewise, U.S. Pat. No. 5,183,252 (Wolber et al.) discloses a vacuum drum with first and second evacuation zones. Each zone includes a number of vacuum holes. An embodiment is shown for accommodating two standard media sizes in which either one or both of the evacuation zones are activated.

Previous vacuum drums having only a single chamber with holes connecting the inner chamber to the surface of the drum used masks to mount smaller films on the drum. A mask was typically L-shaped to block off vacuum holes located beyond the edge of the media to be mounted on the drum. Typically, the mask was an inextensible plastic sheet adhesively attached to the vacuum drum. The sheet would block off the vacuum holes that were located beyond the edges of the media to be mounted, while the media was allowed to be mounted directly to the vacuum drum in the unmasked area.

SUMMARY OF THE INVENTION

The present invention is directed to a vacuum drum apparatus that receives a mask which extends over all of the vacuum holes in the drum. The mask is provided with an array of holes spread over an area that accepts a printing or film substrate of a given size. Substrate media of different sizes may be handled on the drum simply by providing a mask with a different sized array of holes.

The mask of an embodiment of the invention is a flexible sheet perforated with a plurality of holes arranged in an array covering an area no greater than the area of the substrate to be mounted on the vacuum drum. The mask may be adhered to the outer surface of the vacuum drum. According to an embodiment of the invention, the mask is magnetic so that it may be magnetically set in place on the outer surface of the vacuum drum. As used herein, "magnetic" is defined as "magnetized or capable of being magnetized."Thus, magnetic particles include unmagnetized iron or other ferromagnetic particles. The mask may advantageously be made elastomeric so as to act as an effective gasket to seal the vacuum holes of the drum being covered and to seal the circumference of each hole against the substrate. An inextensible layer may be included in the mask to assist in preventing the mask from deforming during rapid rotation of the vacuum drum.

The vacuum drum apparatus of an embodiment of the invention is a circular cylinder mounted for rotation about its axis. The outer surface of the circular cylinder is provided with an array of holes. A low pressure is applied from within the circular cylinder to the array of holes. A perforated mask may be removably mounted on the circular cylinder. Registration holes or pins may be provided for insuring proper alignment of the mask and the substrate on the vacuum drum. An independent array of holes may be provided on the drum with its own suction source. This additional array of holes may be used as a leading edge array for suctioning the leading edge of substrates as they are loaded onto the vacuum drum and mask. A magnetic sheet having an array of holes and an adhesive layer may be adhesively mounted onto the outer surface of the vacuum drum. This provides the vacuum drum with a magnetic surface so that a magnetized mask may stick onto the drum. Alternatively, the drum surface itself may be made of a magnetic material.

The present invention advantageously accommodates substrates of almost any size. In order to accommodate a substrate of a different size, it is only necessary to make a mask with a corresponding array of holes. This is a far simpler task than reengineering a vacuum drum with appropriately sized channels, valves and evacuation zones.

Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
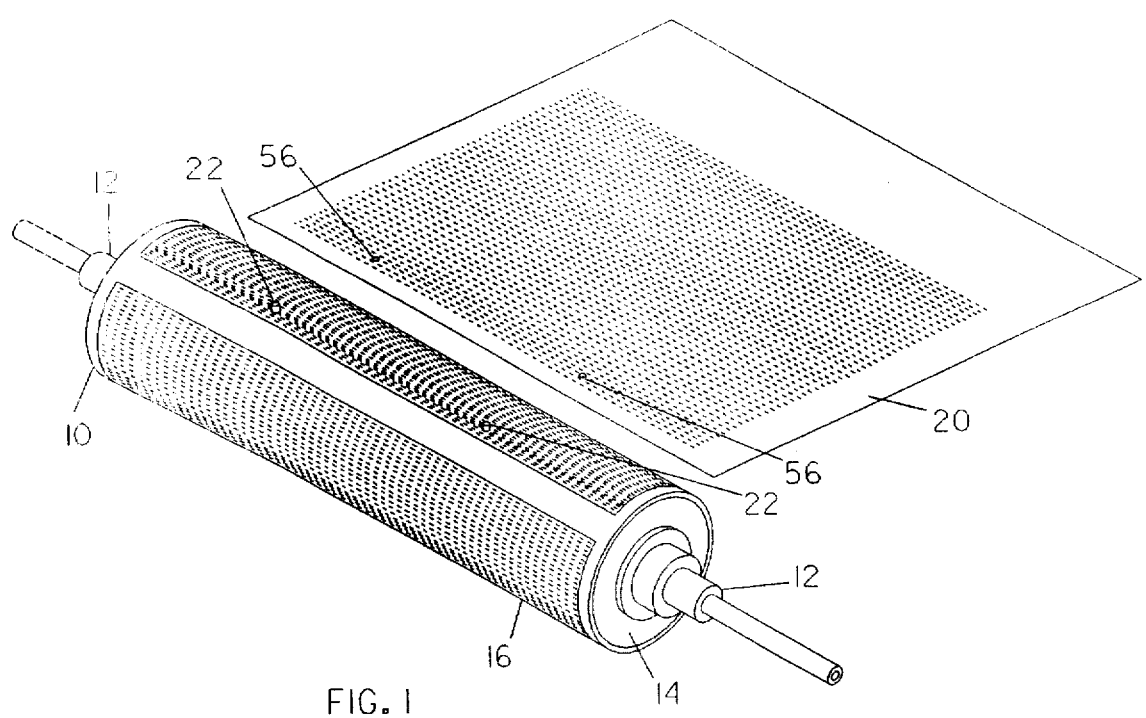
FIG. 1 is an isometric view of a vacuum drum apparatus and mask of the present invention.

Referring now to the drawings, FIG. 1 shows a vacuum drum apparatus of the present invention. A rotatable plotting drum 10 is a circular cylinder. The outer surface 16 of the drum is perforated with a large plurality of holes. The rotatable drum 10 has two opposite end surfaces 14. A shaft 12 is press fit, welded or otherwise attached to each of the end surfaces 14. The drum is mounted so as to be rotatable about its axis.

A mask 20 is provided for blocking off a portion of the holes in the rotatable drum 10 and leaving other holes open to the surface. The array of holes in the mask 20 extends over an area slightly less than that of the printing or film substrate to be applied to the drum for scanning or plotting. To facilitate manual loading of a mask and a substrate onto the vacuum drum 10, the drum is provided with a pair of registration pins 22. These pins are precisely located for mating with a pair of precisely located registration holes in the mask 20. The mask can thus be accurately placed on the vacuum drum by placing the registration holes of the mask onto the registration pins 22. Likewise a printing or film substrate can be accurately loaded onto the drum by placing precision registration holes over the registration pins. The registration pins 22 are outside the plotting and thereby do not interfere with the plotting process.

Figure 2:
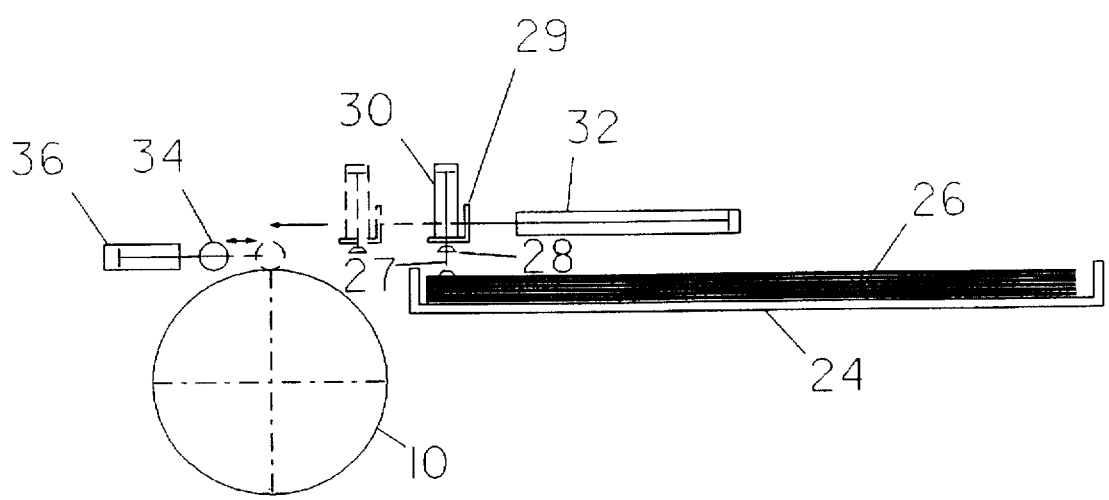
FIG. 2 is a side view schematic drawing of the vacuum drum apparatus of the present invention.

FIG. 2 illustrates how the vacuum drum apparatus of the present invention may be used with conventional automatic loading apparatus. A cassette or tray 24 provides an area within which a plurality of film or aluminum sheet stock substrates are stacked. A pick and place transfer carriage 29 may be provided for removing one substrate at a time from the cassette or tray 24. The transfer carriage 29 may be equipped with a suction cup pick-up device 28 for attaching to one substrate at a time. The suction cup device 28 rides on a cylinder 30 for lowering it into the tray and lifting a substrate up. A separate vacuum (not shown) is attached to the suction cup device to produce the required level of suction. It is further convenient to provide the transfer carriage 29 with a pair of registration pins 27 rather than providing the pins on the vacuum drum. The vacuum drum includes registration holes in place of the pins 22. The pins 27 of the transfer carriage insert through the registration holes of the substrates to provide repeated accurate positioning of the substrates onto the vacuum drum. Once the substrate has been attached to the suction cup 28, a chuck cylinder 32 transports the suction cups and attached substrate toward the vacuum drum 10. During loading, the vacuum drum is stopped from rotation in a predetermined angular position so that the registration pins 27 on the take-up device 28 cleanly mate with the registration holes in the vacuum drum 10. A squeegee roll 34 extends across the width of the vacuum drum. The squeegee roll 34 is attached to a pneumatic cylinder 36 which presses the roll against the vacuum drum. As the drum rotates, the squeegee roll 34 flattens the substrate against the vacuum drum. As the squeegee roll 34 goes by, a vacuum is applied by the vacuum drum 10 to the leading edge of the substrate being placed on the drum. The transfer carriage 29 is removed from the drum and the substrate. A full vacuum is pulled through the drum surface to hold the substrate in place. When a substrate is held to the vacuum drum by the vacuum, the squeegee roll 34 is retracted by the cylinder 36 from the vacuum drum. The plotting or scanning process may then begin upon the substrate.

Figure 3:
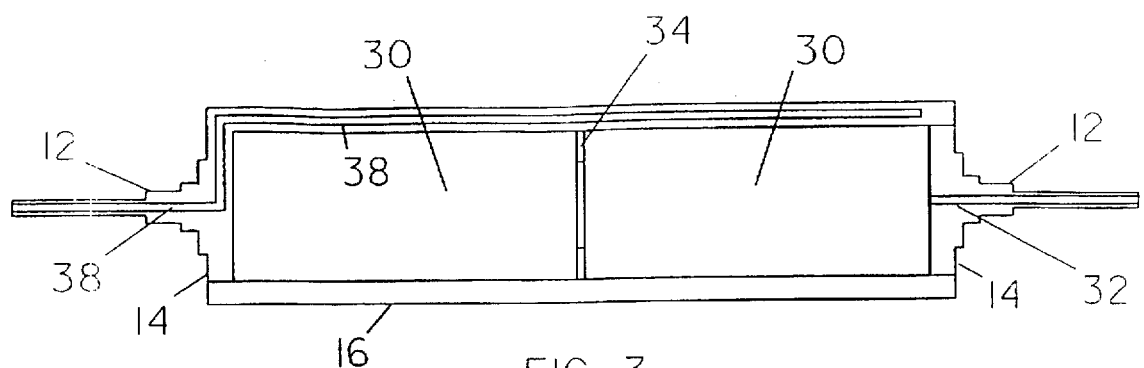
FIG. 3 is a cross-sectional view of the vacuum drum of FIG. 1.

Referring now to FIG. 3, a vacuum chamber 30 within the rotatable drum 10 can be seen. The large volume vacuum chamber is advantageous in that small leaks between a vacuum drum hole and the substrate 26 are unlikely to cause any significant loss of vacuum. On the other hand, the volume of the vacuum chamber 30 can be designed smaller if it is more desirable to reduce the time it takes for the vacuum to reach the outer surface of the drum. A conduit 32 is provided through one of the shafts 12 for connecting the central chamber 30 of the rotatable drum with a low pressure supply for effecting a vacuum within the drum. The low pressure supply is controlled and provided by a vacuum pump, regulator and valve, for example. A reinforcement ring 34 is shown in the center of the drum 10. The ring 34 is open at its center to permit the vacuum to extend throughout the volume of the drum. The reinforcement ring 34 serves to strengthen the drum so as to maintain its circular circumference throughout. The outer surface 16 of the drum 10 is perforated by holes. In the presently preferred embodiment, holes are spaced every 4.57° around the circular circumference of the drum. The holes are equally spaced across the length of the drum approximately every half inch. Each hole in the present embodiment is 0.125 inch in diameter.

Figure 4:
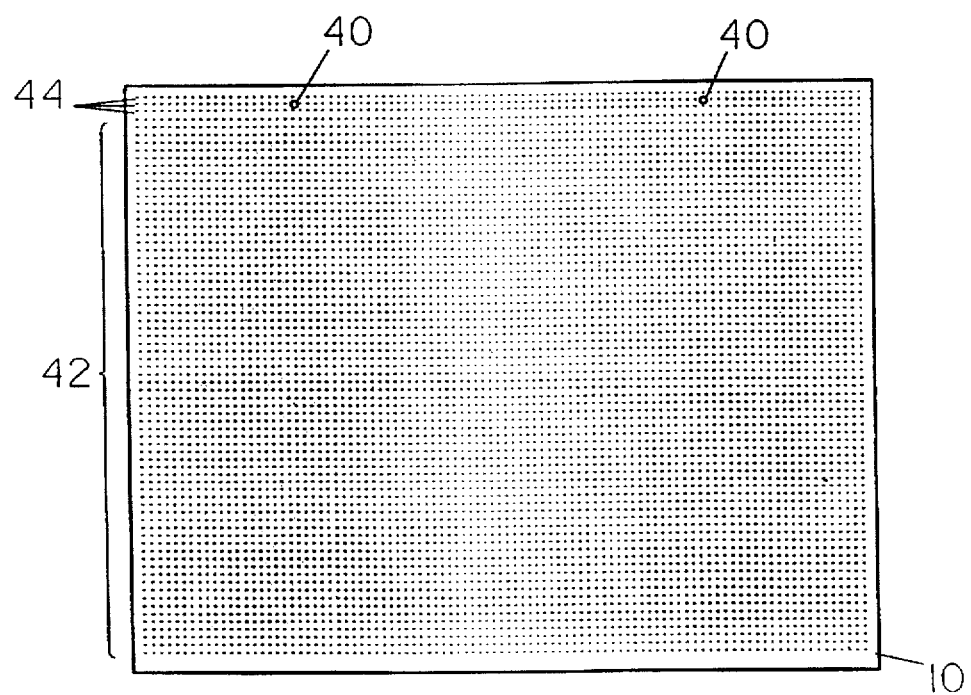
FIG. 4 is a flat unrolled view of the outer surface of the vacuum drum of FIG. 1.

A first plurality of the holes 42 provide fluid communication between the outer surface 16 of the drum and the inner vacuum chamber 30. Referring now to FIG. 4, these holes are spread over a majority of the outer surface of the drum 10. A second plurality of holes 44 is provided for the function of holding down the leading edge of a printing media or substrate. In the presently preferred embodiment, the second plurality of holes 44 constitutes three rows of holes across the drum. This leading edge array of holes 44 does not communicate with the inner vacuum chamber of the drum. Rather, a conduit 38 is provided beneath the outer surface of the drum which connects the leading edge array of holes to a second controlled low pressure source. As shown in FIG. 3, the conduit leads out through the other shaft supporting the rotatable drum. The conduit 38 extends across the drum beneath its outer surface and then down through an end surface of the drum and leaves the drum axially for connection to the second controlled low pressure source.

Located within the area covered by the second plurality of holes are two precision located registration holes 40. Automatic film or aluminum printing plate mounting is performed with the use of registration pins 27 on a pick and place transfer carriage 29. A film or other substrate 26 to be automatically loaded on the rotatable drum 10 is carried by the registration pins 27 onto the drum. The pins are inserted into the registration holes to properly align the leading edge of the film. Manual loading can be alternatively performed by inserting registration pins 22 in the vacuum drum. The film or printing plate can thus be manually placed on the registration pins for proper orientation. The low pressure source attached to the leading edge array of holes 44 is activated once the squeegee roll goes by to maintain a hold on the leading edge of the film as loading is completed.

Figure 5:
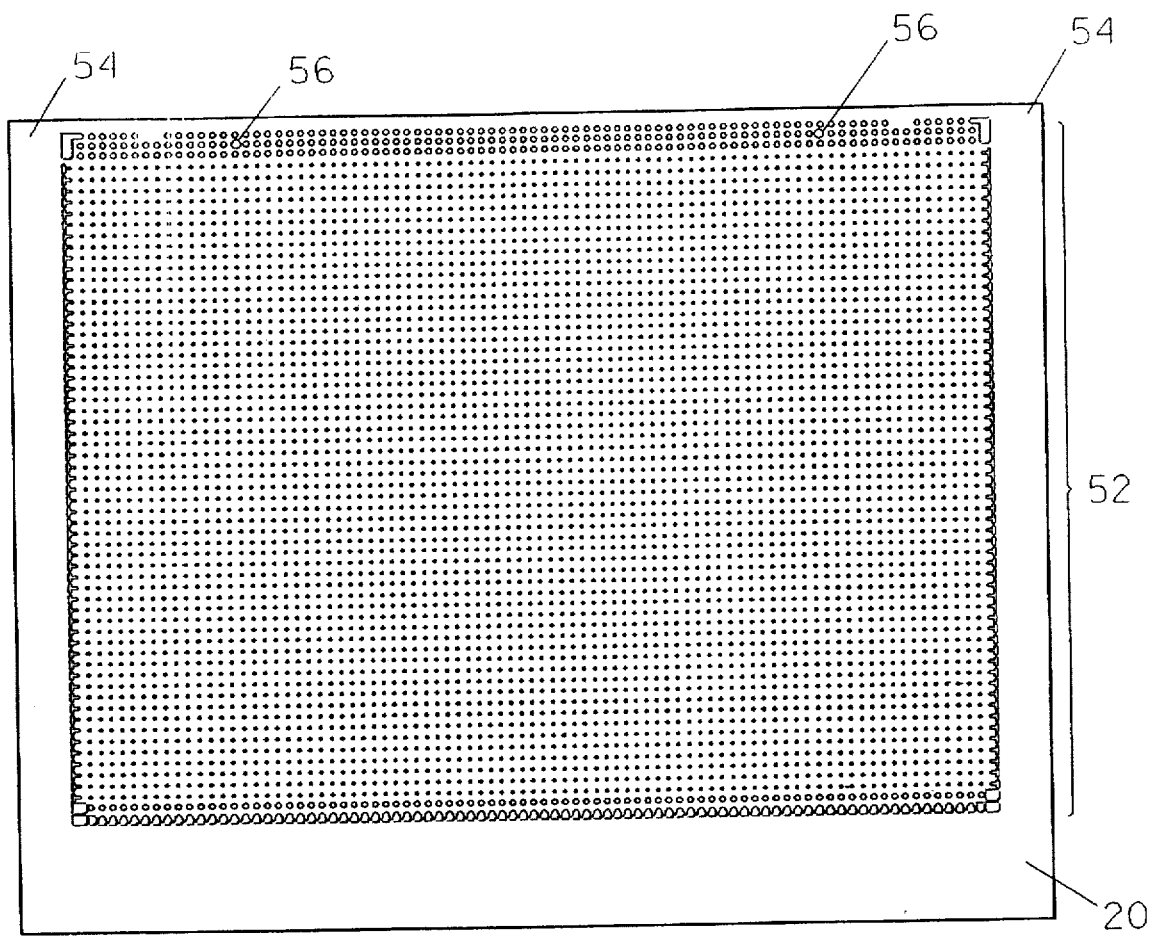
FIG. 5 is a plan view of a mask of the present invention.

In accordance with the present invention, virtually any size substrate, including film media or aluminum sheet stock may be mounted on the drum 10 for plotting or scanning. This is accomplished by providing a mask 20 having an array of holes 52 corresponding to the size of the substrate. Referring now to FIG. 5, a mask 20 of an embodiment of the present invention is illustrated. An outer margin 54 of the mask is solid to provide an area over which the mask will be suctioned onto the rotatable drum. Additional area will be solid to block off those holes which are located beyond the outer dimensions of the substrate to be mounted. The mask includes a plurality of holes 52 arranged in an array covering an area no greater than the area of the substrate to be mounted on the drum. The holes in the mask are spaced apart from each other in an identical fashion to the spacing of the holes in the rotatable drum. The array of holes will include holes oriented to overlie the leading edge array of holes 44 as well as the first array of holes 42 in the drum. Likewise, the mask 50 includes two registration holes 56 for orientation in alignment with the registration holes in the rotatable drum. Thus the registration holes are available for use in properly aligning the substrate on the drum. This particularly facilitates automatic mounting of the substrate onto the drum.

The sizes of the holes in the mask may vary from the holes in the rotatable drum. The holes in the mask may be larger or smaller than those in the drum. Moreover, the shape of the holes may be altered. For example, the shape may be star-shaped, round, square, or any other geometric shape. It has been found that large holes are desired in the mask for mounting a stiffer substrate such as an aluminum printing plate on the rotatable drum. On the other hand, for mounting a delicate film media, it is desirable to provide small holes in the mask. Larger holes on such a delicate media may cause dimples in the media which could distort the image being plotted or scanned. The larger holes provide the vacuum pressure over a larger area and thus exert greater force for holding a stiffer material onto the rotatable drum.

In order to securely hold a substrate on the rotating vacuum drum with a vacuum, it is essential that the edges of the substrate be held securely down against the mask 20. Therefore it is desirable to make the holes around the outer edge of the array 52 in the mask larger than the remaining majority of the holes. It is desirable that the outer edge holes get as close to the edge of the substrate as possible without extending beyond the edge of the substrate. Besides making the edge holes larger, it has also been found useful to elongate the edge holes along the row closest to the trailing edge of the substrate. Even greater care is taken with suctioning the corners of the substrate onto the mask. Large corner holes having an outer rectangular edge to fit closely against the corner edge of the substrate are presently preferred for improving the vacuum hold upon the substrate during rotation of the vacuum drum.

Figure 6:
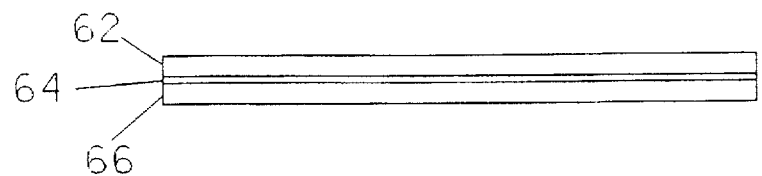
FIG. 6 is a cross-sectional view of the mask of FIG. 4.

A cross-section of the presently preferred cross-section of a mask is shown in FIG. 6. The mask is made of a three-layer material. The thickness of the mask is uniform at least throughout the area on which the substrate will be placed. The present embodiment is preferably about 30 thousandths of an inch thick. A top layer 62 is made of an elastomeric material such as rubber. It is desirable that the mask have a resilient surface soft enough to act as a gasket to form a seal between the mask and the substrate around the circumference of the holes. This can advantageously replace the use of mechanical clamping to seal the substrate to a drum surface.

The high speed rotation of the rotatable drum 10 may cause an elastomeric mask to stretch and thus deform, thereby possibly distorting the scanning or plotting process. It is therefore preferred that the mask include an inextensible layer 64. The middle layer of the presently preferred mask is an inextensible layer 64 made of a sheet of Mylar™. The inextensible layer 64 resists the centrifugal forces pulling on the mask during rotation of the drum. A bottom layer 66 of the mask is an elastomeric material including ferromagnetic particles disbursed throughout. The present mask material is known as Magnaflex and has been manufactured by Fulflex, Inc. of Middletown, R.I. A mask is made by taking the desired mask material and cutting the array of holes therein. The presently preferred method for precisely cutting the holes consists of laser cutting. Computer generated files can be used to accurately and consistently reproduce a hole array in proper alignment with drum holes and desired substrate location.

A mask must be initially staged on the rotatable drum prior to pulling the vacuum. The mask will also need to be adhered to the drum by some means other than vacuum when the substrate is removed. According to an aspect of the present invention, masks can be mounted on the rotatable drum without requiring mechanical clamps or other mechanical holding mechanisms to hold the mask in place prior to full application of the vacuum. While such clamps may be used to attach the mask within the scope of the present invention, it is preferred to use an attractive force between the mask surface and the drum surface, such as magnetism or adhesion. The present embodiment uses magnetic force to hold the mask in position on the rotatable drum when vacuum is off or being lost through open holes. In accordance with an embodiment of the present invention, magnetic or adhesive force is provided to attract the entire surface of the mask. Magnetic force is achieved by providing ferromagnetic particles about the outer surface of the rotatable drum and in the mask and magnetizing the particles in either the outer surface of the drum or the mask. Adhesive force may be provided by an appropriate adhesive coating on the mask. Moreover, a mechanical hold can be obtained using Velcro™ type mechanical entanglement to hold the mask on the drum.

Figure 7:
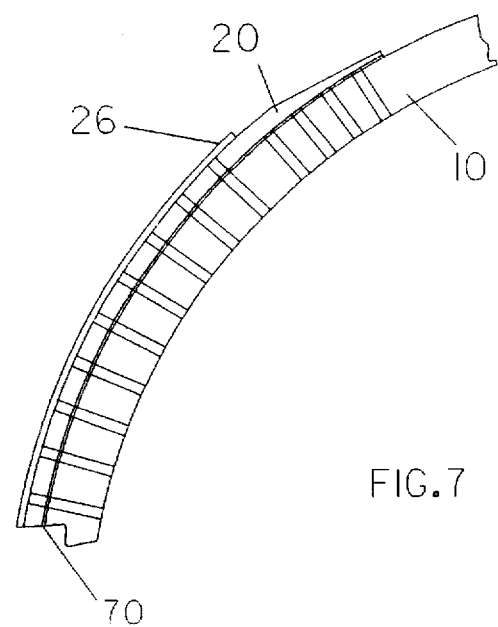
FIG. 7 is a partial cross-sectional view of a vacuum drum of the present invention provided with a mask and a printing substrate thereon.

In the embodiment of FIG. 7, the drum has been made of a non-ferromagnetic material. The drum may be made from aluminum for example. The Single wall aluminum drum of the invention is advantageously lightweight enabling faster rotational acceleration and therefore greater printing throughout. A sheet 70 perforated with all the drum holes so as to align with the drum outer surface may be adhered about the outside of the drum. The sheet 70 may be provided with an adhesive layer for securing it to the drum outer surface. The sheet 70 includes magnetic material and may be magnetized so that the mask 20 only need include magnetic particles. The mask 20 is then placed over the magnetic sheet and held to the drum by the magnetization forces. A substrate is held over the array of holes in the mask by the vacuum pressure from the drum.

Figure 8:
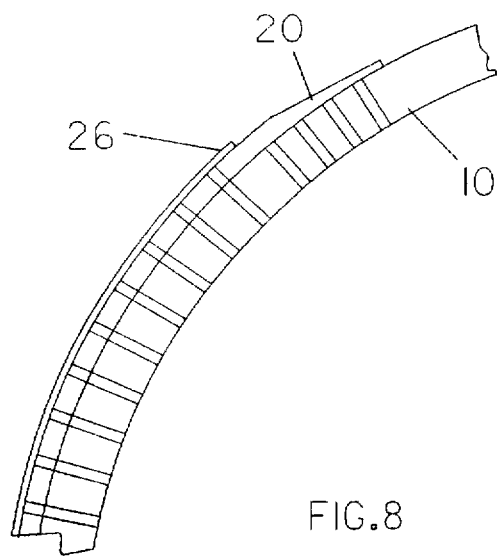
FIG. 8 is a partial cross-sectional view of an alternative embodiment of a vacuum drum of the present invention with a mask and printing substrate thereon.

An alternate embodiment of the invention is shown in FIG. 8, the drum is made with a half-inch thick ferromagnetic material such as steel. The mask including ferromagnetic particles is placed over the drum and oriented with the use of the registration holes. Either the drum surface or the ferromagnetic particles of the mask are magnetized. A substrate may be mounted over the mask 20 to cover the array of holes 52 in the mask. The substrate is held to the mask by the vacuum being pulled through the drum chamber.

It is a simple matter to modify the rotatable vacuum drum apparatus of the invention for use with printing plates or film media of different sizes. It is only necessary to replace the mask with a new mask having an appropriate array of holes. Accurate placement of the mask and substrate is achieved by the registration holes. A precise circular surface is maintained by holding the mask to the surface throughout by magnetic force and, if desired, by including an inextensible layer in the mask. Substrates of various thickness and stiffness are accommodated by varying the hole sizes within the mask. The mask further improves the retention of the substrate on the rotatable drum surface by its resilient surface which forms a good seal between the substrate and the mask without clamps.

Of course, it should be understood that various changes and modifications to the preferred embodiments described above will be apparent to those skilled in the art. For example, the mask may be provided with an adhesive layer or Velcro™ for sticking the mask on the rotatable drum. Any one or more of the mask layers in the preferred embodiment could be deleted. The inextensible layer may be achieved by a web rather than a sheet. These and other changes can be made without departing from the spirit and the scope of the invention and without diminishing its attendant advantages. It is therefore intended that such changes and modifications be covered by the following claims.

I claim:

1. A mask for mounting a substrate of a given area onto a vacuum drum comprising:

a flexible elastomeric sheet having two flat opposing outer faces and an inextensible layer, said sheet having a plurality of unobstructed holes piercing through said sheet arranged in an array covering an area no greater than the given area of said substrate, each of said holes having a perimeter formed in elastomeric material on one of the flat outer faces of said sheet.

2. The mask of claim 1 wherein said sheet includes a leading edge and at least two precision spaced alignment openings located between the leading edge and the array of holes.

3. The mask of claim 2 wherein said sheet further includes a trailing edge and wherein the array of holes includes a row of holes closest to the trailing edge having holes larger in size than holes in the center of said array.

4. The mask of claim 1, further comprising edge holes larger in area than any of said plurality of holes, said edge holes being located about the outer edges of said array.

5. The mask of claim 1 further comprising means for holding said flexible elastomeric sheet against said vacuum drum.

6. The mask of claim 1 further comprising magnetic particles dispersed within said flexible elastomeric sheet.

7. The mask of claim 6 wherein said magnetic particles are magnetized.

8. The mask of claim 1 wherein the array of holes is a rectangular array.

9. The mask of claim 1 further comprising corner holes at the outer corners of said array, said corner holes having rectangular outer edges.

10. The mask of claim 1 wherein said flexible elastomeric sheet comprises an elastomeric top layer and a magnetic bottom layer including means for holding said flexible elastomeric sheet against said vacuum drum and wherein the inextensible layer lies in between the top layer and the bottom layer.

11. The mask of claim 10 wherein said means for holding comprises ferromagnetic particles.

* * * * *